(12) United States Patent
Celaya et al.

(10) Patent No.: US 9,702,266 B2
(45) Date of Patent: Jul. 11, 2017

(54) TURBOCHARGER TURBINE HOUSING

(71) Applicant: Honeywell International Inc., Morristown, NJ (US)

(72) Inventors: Aitor Herrera Celaya, Brno (CZ); Roman Kolacek, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 346 days.

(21) Appl. No.: 14/318,990

(22) Filed: Jun. 30, 2014

(65) Prior Publication Data

US 2015/0377064 A1    Dec. 31, 2015

(51) Int. Cl.
  *F01D 25/14* (2006.01)
  *F01D 25/28* (2006.01)
  (Continued)

(52) U.S. Cl.
  CPC ............. *F01D 25/14* (2013.01); *F01D 9/026* (2013.01); *F01D 25/12* (2013.01); *F01D 25/24* (2013.01); *F01D 25/28* (2013.01); *F02B 39/16* (2013.01); *F02C 6/12* (2013.01); *F02B 2039/164* (2013.01); *F05D 2220/40* (2013.01); *F05D 2240/14* (2013.01); *F05D 2300/603* (2013.01)

(58) Field of Classification Search
  CPC .......... F01D 25/14; F01D 25/24; F01D 25/28; F02C 6/12; F04D 29/58; F04D 29/5826; F04D 29/584
  See application file for complete search history.

(56) References Cited

U.S. PATENT DOCUMENTS 2,273,138 A    2/1942 Peterson
2,900,168 A *  8/1959 Nyborg ..................... F02K 9/64
                                                165/104.31
(Continued)

FOREIGN PATENT DOCUMENTS

DE    102010038909 A1 *  2/2012 ............. F01D 9/026
DE    202013007472 U1 *  9/2013 ............. F01D 25/14
(Continued)

OTHER PUBLICATIONS

Machine translation of DE 102010038909 A1 provide by Espacenet; last accessed: Aug. 15, 2016.*
(Continued)

*Primary Examiner* — Dwayne J White
*Assistant Examiner* — Sang K Kim
(74) *Attorney, Agent, or Firm* — Brian J. Pangrle

(57) ABSTRACT

A turbocharger turbine housing can include a base that defines a turbine wheel opening that includes an axis that defines an axial direction; an exhaust inlet flange that defines an exhaust inlet; an exhaust outlet flange that defines an exhaust outlet; a wastegate shaft bore, a wastegate passage, a wastegate opening for the wastegate passage and a wastegate seat disposed about the wastegate opening; bosses where each of the bosses defines a coolant opening; a spiral coolant passage in fluid communication with at least two of the coolant openings where the spiral coolant passage includes at least two windings with respect to an axial dimension of the turbocharger turbine housing; and at least one coolant passage that is in fluid communication with at least two of the at least two windings of the spiral coolant passage.

15 Claims, 9 Drawing Sheets

(51) Int. Cl.
*F02B 39/16* (2006.01)
*F01D 25/12* (2006.01)
*F01D 25/24* (2006.01)
*F01D 9/02* (2006.01)
*F02C 6/12* (2006.01)

(56) References Cited

U.S. PATENT DOCUMENTS

| | | | |
|---|---|---|---|
| 3,811,741 A | 5/1974 | McInerney et al. | |
| 4,068,612 A | 1/1978 | Meiners | |
| 4,655,043 A | 4/1987 | McInerney | |
| 4,930,460 A | 6/1990 | Aihara et al. | |
| 4,969,805 A | 11/1990 | Romeo | |
| 5,016,437 A * | 5/1991 | Huether | F01D 25/32 60/280 |
| 5,020,319 A | 6/1991 | Matsuura et al. | |
| 5,554,343 A | 9/1996 | Wade | |
| 6,035,637 A | 3/2000 | Beale et al. | |
| 6,951,450 B1 | 10/2005 | Figura et al. | |
| 7,108,488 B2 | 9/2006 | Larue et al. | |
| 7,988,426 B2 * | 8/2011 | Elpern | F01D 25/125 415/112 |
| 8,181,632 B2 * | 5/2012 | Ueno | F01D 25/14 415/177 |
| 2005/0199509 A1 | 9/2005 | Ross | |
| 2010/0175377 A1 | 7/2010 | Hippen et al. | |
| 2011/0008158 A1 | 1/2011 | Boening | |
| 2012/0082566 A1 * | 4/2012 | Ellis | F01D 5/087 416/97 R |
| 2012/0201655 A1 * | 8/2012 | Kusakabe | F01D 9/026 415/116 |
| 2013/0149126 A1 * | 6/2013 | Herrera Celaya | F02B 37/183 415/200 |
| 2013/0323020 A1 * | 12/2013 | Bogner | F01D 25/14 415/116 |
| 2015/0086345 A1 * | 3/2015 | Yang | F04D 29/403 415/177 |
| 2015/0247449 A1 * | 9/2015 | Krewinkel | F02B 37/025 417/405 |

FOREIGN PATENT DOCUMENTS

| | | |
|---|---|---|
| EP | 0078637 A1 | 5/1983 |
| EP | 834646 A1 | 4/1998 |
| EP | 1445448 A1 | 8/2004 |
| IT | GB 2103718 A * 2/1983 | ............. F01D 11/24 |
| JP | 2003035153 A | 2/2003 |
| JP | 3489332 B2 | 1/2004 |
| WO | 2009102546 A1 | 8/2009 |
| WO | 2009106159 A1 | 9/2009 |
| WO | 2012089459 A1 | 7/2012 |
| WO | 2012125385 A2 | 9/2012 |

OTHER PUBLICATIONS

Machine translation of DE 202013007472 U1; Retrieved from Espacenet on Feb. 15, 2017.*
ACTech, Development of Water-Cooled Exhaust Turbo Chargers, Engine Expo 2010, Jun. 22-24, 2014 (11 pages).
EP Application No. 15170748.8-1610 / 2966271, Exam and Search Report of Dec. 16, 2015 (6 pages).

* cited by examiner

TURBOCHARGER TURBINE HOUSING

TECHNICAL FIELD

Subject matter disclosed herein relates generally to turbomachinery for internal combustion engines and, in particular, to turbine housings.

BACKGROUND

A turbocharger exhaust turbine housing may at least partially house a turbine wheel and may receive exhaust generated by an internal combustion engine, for example, to rotate the turbine wheel. Exhaust entering such a turbine housing may be at a temperature of up to about 500 degrees C. or more. For example, diesel exhaust may vary from about 100 degrees C. at idle to about 500 degrees C. at high load while, for a gasoline engine, exhaust temperature may, at an upper end, exceed about 1000 degrees C. Transfer of heat energy from exhaust to various components of a turbocharger may be, at times, detrimental to turbocharger operation.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
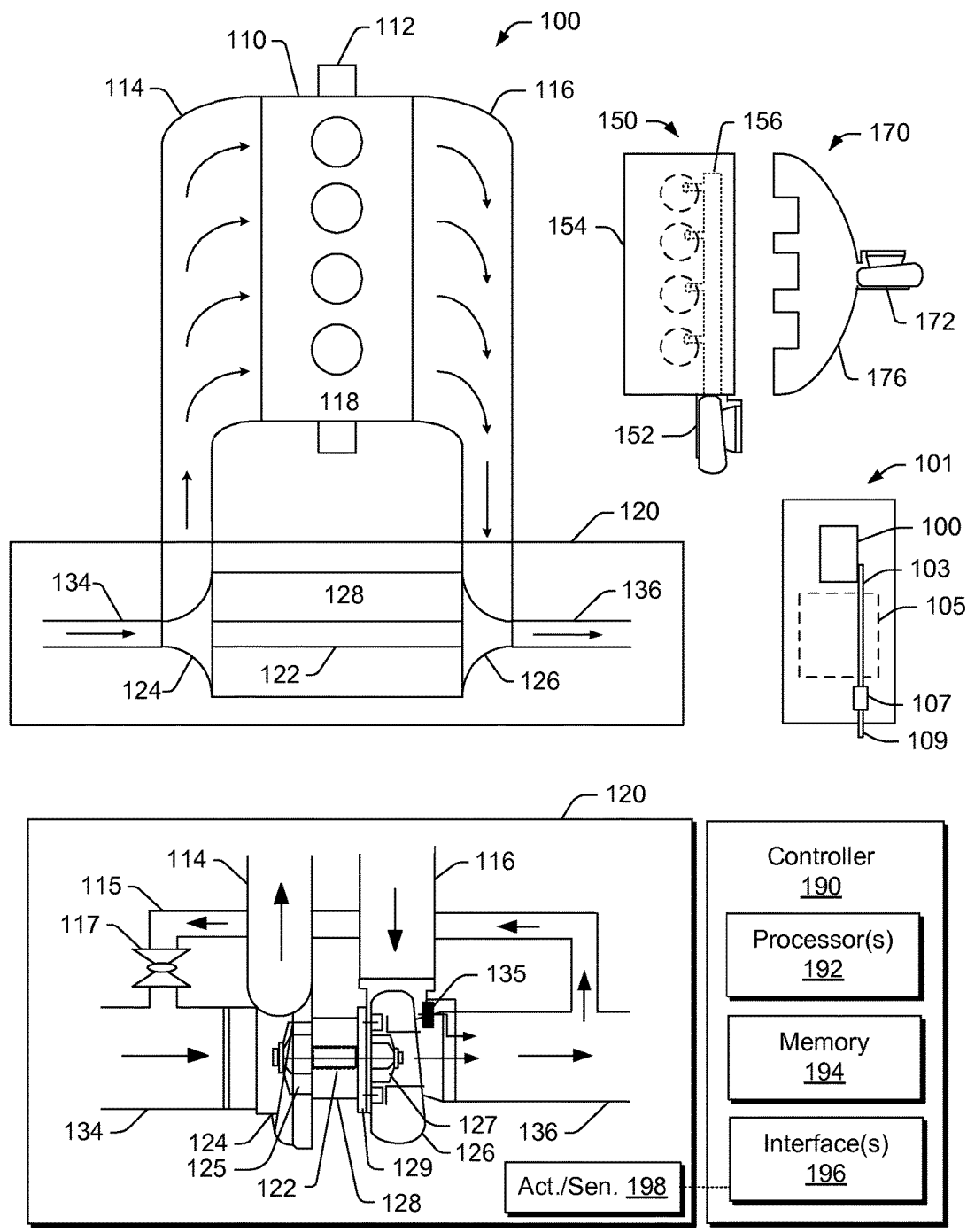
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc.

As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

As to wastegates, a wastegate may be configured as an external wastegate or an internal wastegate. In general, a wastegate may be configured as a valve that is controllable to selectively allow at least some exhaust to bypass a turbine. As an example, where an exhaust turbine drives a compressor for boosting inlet pressure to an internal combustion engine (e.g., as in a turbocharger), a wastegate provides a means to control boost pressure.

An internal wastegate may be integrated at least partially into a turbine housing and, for example, include a flapper valve (e.g., a plug), a crank arm, a shaft or rod, and an actuator. A plug of a wastegate may include a surface that is configured to seat against a seat disposed about an exhaust bypass opening (e.g., a valve seat or wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). High load requirements may generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high (e.g., up to about 1000 degrees C. or more).

As an example, a turbine housing may be a cast component that includes passages for flow of fluid, which may be used, for example, to extract heat energy to thereby cool the turbine housing. For example, consider a turbine housing that includes passages for flow of water and/or other coolant. In such an example, depending on conditions, the turbine housing may be fabricated from a desired material or materials (e.g., lower temperature materials, lower weight materials, etc.). As an example, a turbine housing with coolant passages may radiate less heat in an engine compartment, may allow for heat recovery (e.g., energy management), may improve engine cold start behavior, may increase performance (e.g., fuel consumption, etc.) and may offer possible cost reductions. As to materials, consider a turbine housing made of one or more of the following materials: silicon molybdenum (SiMo), D5S/D35, and aluminum. For example, consider Table 1, below, which lists some examples of materials along with examples of manifold and exhaust temperatures (degrees C.).

TABLE 1

|  | Max. Manifold Temp | Max. Exhaust Temp |
|---|---|---|
| SiMo 0.5% | 750 | 820 |
| SiMo 1% | 780 | 820 |
| SiMo Ni | 795 | 835 |
| Ni Resist D5S | 870 | 950 |

As an example, a turbine housing may be made of aluminum, which may be an aluminum alloy. In such an example, a weight reduction may be realized compared to a turbine housing made of a similar volume of material that has a higher density.

Manufacture of a turbine housing with coolant passages can pose some difficulties. For example, in a casting process, difficulties of fitting a coolant core circuit with respect to a turbine housing with a wastegate passage include issues as to fitting the coolant core around a wastegate channel without affecting turbine wheel contour (e.g., shroud contour) and issues as to cooling down a bushing area (e.g., which may be exposed to high temperatures).

As an example, a coolant core may be provided that allows a casting process to be relatively stable and, for example, relatively repeatable. Such a core may aim to achieve one or more heat transfer condition targets for a turbine housing.

As an example, a coolant core may be a serpentine core that can be used in a casting process to impart coolant passages to a cast turbine housing. Such an approach may provide for relatively stable and relatively uniform heat removal. For example, a heat transfer exchange ratio may be achieved while keeping coolant flow associated pressure drop under control (e.g., to within one or more targets).

As an example, a coolant core may include features that may mitigate risks of core cracking or displacement during pouring, which could possible lead to detrimental issues such as, for example, casting quality, scrap rate (e.g., due to cases where wall thickness between core may be too small or even with cracks), tool damage, etc. For example, a coolant core may include one or more backbone features, for example, consider a rib and backbone construction (e.g., with one or more backbones and one or more ribs).

As an example, a coolant core may include one or more casting features, for example, consider a restricted channel, which may increase resistance and stability of the core during pouring.

As an example, a backbone approach may help to control non-desired bypasses and recirculation, which may minimize impact of additional dead volume(s) on fluid dynamic behavior. As an example, a backbone approach to a coolant core may provide for formation of a turbine housing with coolant passages that can be adequately flushed and that can provide for adequate heat transfer.

As an example, a coolant core may be provides with rigidizing features, for example, that impart structural stability to facilitate casting of a turbine housing with coolant passages. As an example, features may provide a desired design of one or more recesses with limited undesirable direct bypass(es), for example, to achieve a desired level of heat removal. A coolant core may be configured to impart coolant passages to one or more particular regions.

One or more cores may be used in a casting process to cast a housing where, for example, passages in the housing may be created in a negative manner with respect to positive features of at least one core. As an example, a casting process may be a gravity-pour sand casting process. As an example, a housing may be made of hardened molten material (e.g., metal, alloy, etc.) that is shaped at least in part by at least one core. As an example, a core may be made of compacted sand, which may be disintegrated and removed from a cast housing after the material forming the cast housing has solidified and cooled.

Figure 2:
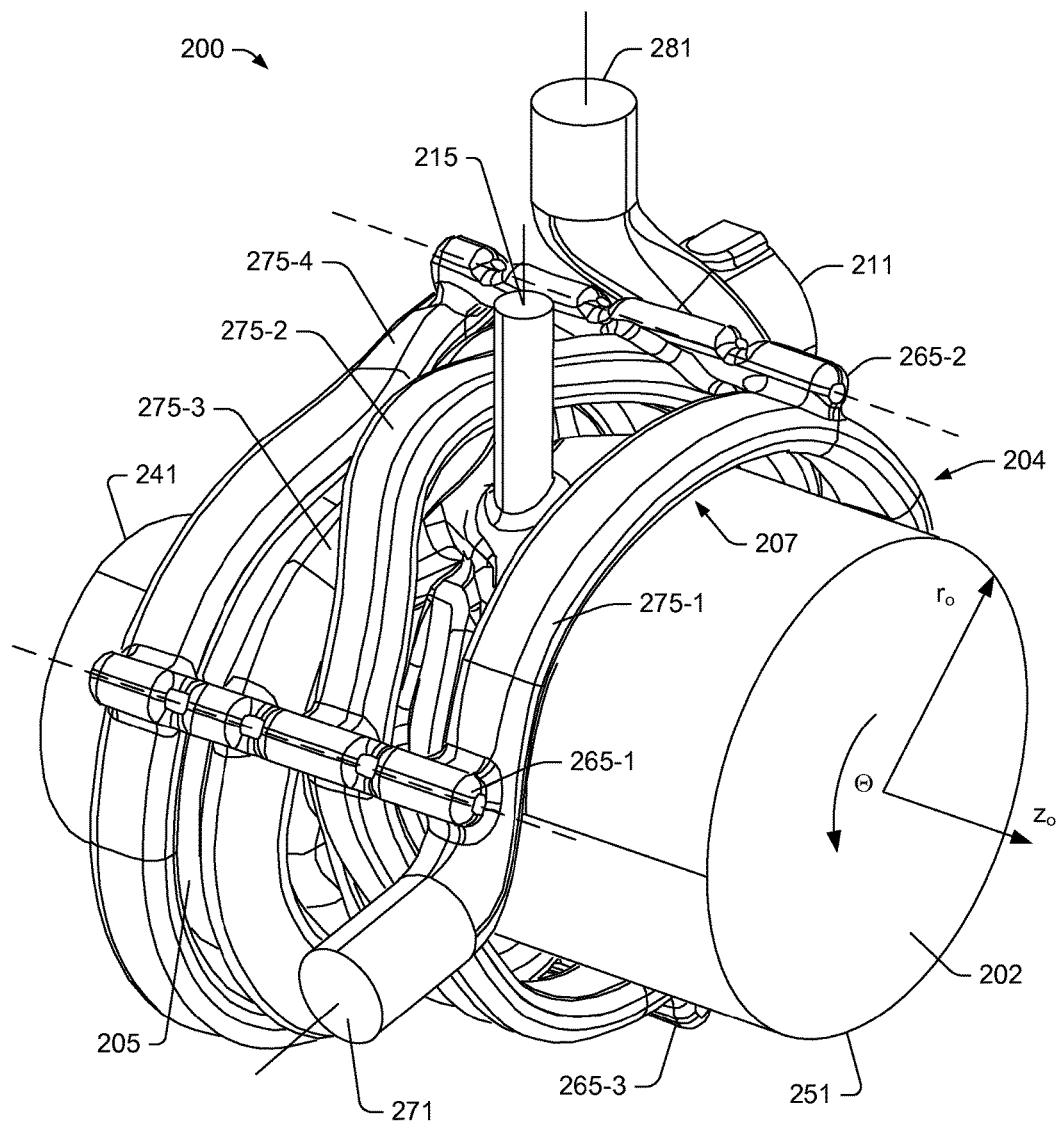
FIG. 2 is a perspective view of an example of an assembly that includes a coolant passage core and a central core.

FIG. 2 shows an example of an assembly 200 that includes a central core 202 and a coolant passage core 204. As shown, the central core 202 includes a volute forming portion 205, an inlet portion 211, a wastegate shaft bore portion 215, a turbine wheel opening portion 241 and an outlet portion 251. As shown, the coolant passage core 204 includes a spiral tubular portion 207 that extends from end 271 to end 281 that is supported by a plurality of members 265-1, 265-2 and 265-3. FIG. 2 also shows the central core 202 as including an outlet axis ($z_o$); noting that the central core 202 may also include an inlet axis (e.g., $z_{in}$). Positions of the spiral tubular portion 207 and the members 265-1, 265-2 and 265-3 may be defined with respect to one or more axes of the central core 202.

As shown in the example of FIG. 2, the spiral tubular portion 207 can include a plurality of windings 275-1, 275-2, 275-3 and 275-4 where each of the windings 275-1, 275-2, 275-3 and 275-4 may be supported by at least one of the plurality of members 265-1, 265-2 and 265-3. As shown, the spiral tubular portion 207 of the coolant passage core 204 is disposed a radial distance from portions of the central core 202 and the members 265-1, 265-2 and 265-3 are disposed along radial outwardly facing surfaces of the spiral tubular portion 207.

As an example, the members 265-1, 265-2 and 265-3 may be considered to form backbone features while the spiral tubular portion 207 may be considered to form rib features (e.g., ribs extending from a backbone). The members 265-1, 265-2 and 265-3 may provide structural integrity to the coolant passage core 204, particularly to the spiral tubular portion 207. As an example, the wastegate shaft bore portion 215 of the central core 202 may be a feature that is installed after positioning the coolant passage core 204. For example, the central core 202 may be configured to be positioned into a central space defined by the coolant passage core 204 where the wastegate shaft bore portion 215 may then be added (e.g., received via an opening, etc.) to form the assembly 200. As shown in the example of FIG. 2, the winding 275-1 passes to one side of the wastegate shaft bore portion 215, the winding 275-2 passes to another side of the wastegate shaft bore portion 215, the member 265-1 is disposed to one side of the wastegate shaft bore portion 215 and the member 265-2 is disposed to another side of the wastegate shaft bore portion 215. In such an example, the wastegate shaft bore portion 215 is "boxed" by structural features that can form coolant passages in a cast turbine housing. Such an approach can provide for cooling of a wastegate shaft bore formed in a cast turbine housing. As an example, the members 265-1 and 265-2, the windings 275-1 and 275-2, and the wastegate shaft bore portion 215 may be described via the cylindrical coordinate system, for example, as to r, z and Θ positions.

Upon casting with cast material, the assembly 200 may form various features of a turbine housing with coolant passages. As an example, the coolant passages of such a turbine housing may include coolant passages formed via the spiral tube portion 207 and the members 265-1, 265-2 and 265-3. As an example, the members 265-1, 265-2 and 265-3 may be considered to form backbone features while the spiral tube portion 207 may be considered to form rib features.

Figure 3:
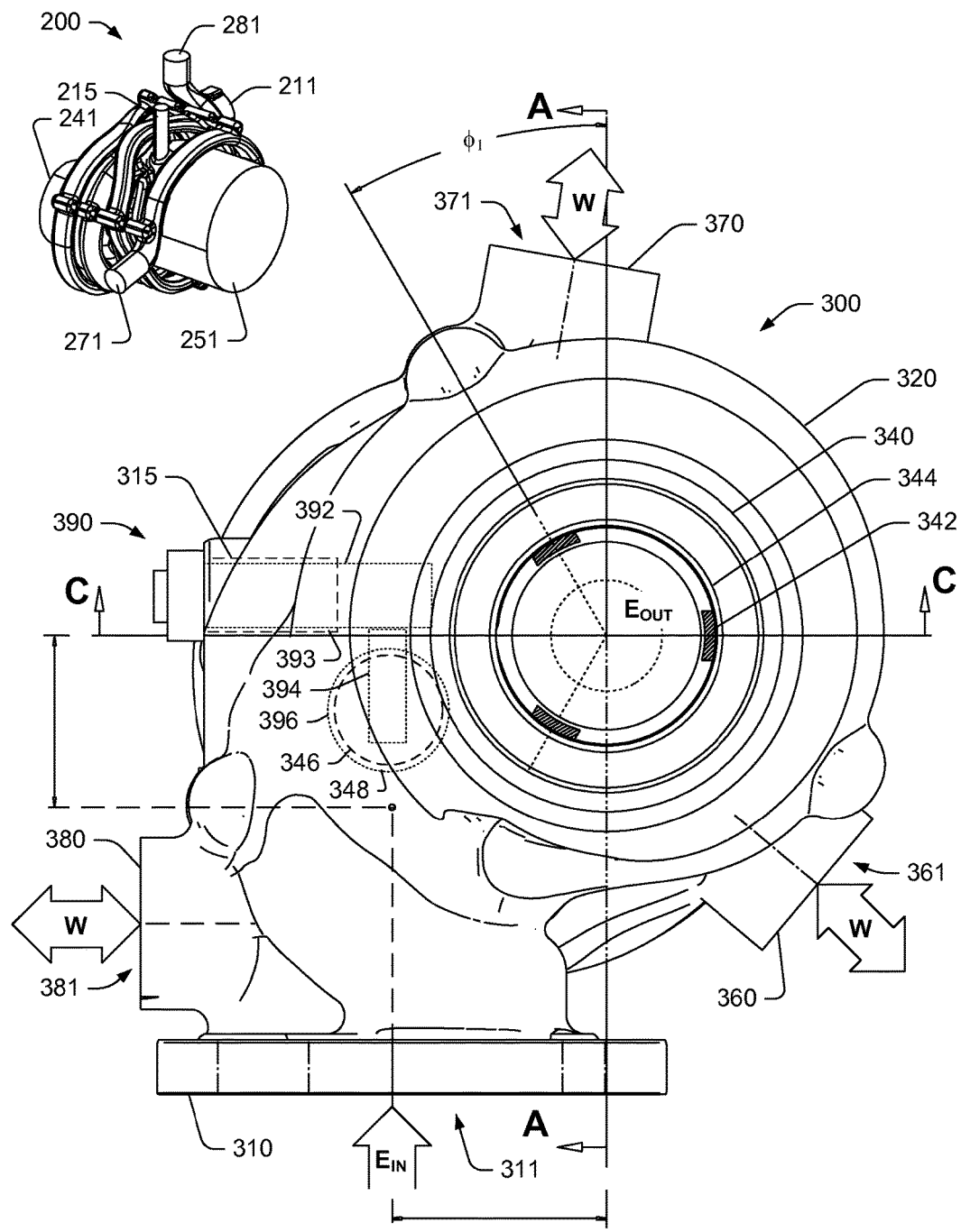
FIG. 3 is a plan view of an example of a turbine housing.

FIG. 3 shows a lower plan view of an example a turbine housing 300 formed in part via the assembly 200 of FIG. 2. As shown, the turbine housing 300 includes a flange portion 310 that includes an exhaust inlet 311, a bore 315 for a wastegate shaft, a volute wall 320, a base 340 (e.g., a center housing flange portion) that includes an opening 341 for receipt of a turbine wheel, features 342 disposed inwardly from a throat of a volute (e.g., for dimensional control for machining of the turbine housing), a turbine wheel shroud wall 344, coolant openings 361, 371 and 381 defined respectively by bosses 360, 370 and 380, and a wastegate opening 346 of a wastegate passage 347 (see, e.g., FIG. 5) where a wastegate seat 348 surrounds the wastegate opening 346.

FIG. 3 also shows an example of a wastegate assembly 390 that may include, for example, a shaft 392, an arm 394 that extends from the shaft 392 and a wastegate plug 396 that extends from the arm 394. As shown, the shaft 392 may be at least partially received by the bore 315, optionally with a bushing or bushing therebetween. In such an example, rotation of the shaft 392 may control the position of the wastegate plug 396 with respect to the wastegate opening 346.

As to the coolant openings 361, 371 and 381, as an example, one of these openings may be used for purposes of core stability (e.g., to help maintain core stability). In such an example, the other two openings (e.g., the openings 381 and 371) may be used as an inlet and an outlet, for example, depending on packaging (e.g., engine bay characteristics, etc.), housing cooling strategy, etc. For example, one application may prefer to set the opening 381 as an inlet and to set the opening 371 as an outlet while another application may prefer to set the opening 371 as an inlet and to set the opening 381 as an outlet.

As mentioned, various components of a wastegate (or wastegate assembly) may be susceptible to wear, misalignment, etc. A turbine housing that includes coolant passages may optionally be cooled to remove heat energy, which may act to reduce temperatures, reduce temperature gradients in time, reduce temperature gradients in space, etc., which may act to improve operation, longevity, etc. of a wastegate. For example, where temperatures may be maintained within a range via coolant flow, thermal expansion of components may be more effectively managed (e.g., and one or more clearances), which may act to reduce risk of exhaust leakage about a shaft, a bushing, etc.

As an example, risk of exhaust leakage about a wastegate shaft may be reduced via flowing coolant in a cooling passage of a turbine housing where the coolant passage may be a spiral that includes a winding that passes to one side of a wastegate shaft bore of the turbine housing and a winding that passes to another side of the wastegate shaft bore. Such an approach may act to maintain controllability of the wastegate shaft and hence a wastegate opening via a plug operatively coupled to the wastegate shaft or integral to the wastegate shaft.

As an example, a turbine housing may include wastegate features and a plurality of coolant passages that pass within the turbine housing where one or more of the coolant passages pass proximate to one or more of the wastegate features. In such an example, one or more of the coolant passages may pass proximate to a wastegate shaft bore that may include a wastegate shaft optionally supported by a bushing. In such an example, coolant may act to regulate the temperature of the wastegate shaft bore and hence the wastegate shaft and bushing, if present.

As an example, a turbine housing may be cooled via coolant that flows in coolant passages to reduce heat radiation to an engine compartment. Such coolant may act as a heat recovery fluid, for example, for energy management. As an example, coolant may be heated by operation of a turbocharger where the heated coolant may act to improve engine cold start behavior. In such an example, an improvement may be realized as to performance, including, for example, improvement in fuel consumption (e.g., efficiency).

As an example, a turbine housing may be mounted in an engine compartment in an orientation with respect to gravity. Depending on the orientation, buoyancy may cause bubbles to flow in a particular direction. As an example, one or more coolant passages may be oriented in a direction that allows for flow of bubbles along the one or more coolant passages. For example, consider the passages having shapes formed by the members 265-1, 265-2 and 265-3 as being oriented axially with respect to gravity to promote flow of bubbles in the passages. In such an example, a bubble may flow from a spiral coolant passage to one of the axially directed passages. Such an arrangement may act as a bubble separator (e.g., to separate out air from coolant flowing in the spiral coolant passage). As an example, certain passages may be referred to as backbone passages that connect at least two windings of a spiral passage. In such an example, a backbone passage may act to release trapped air bubbles (e.g., during charging of coolant, etc.). As an example, depending on conditions, coolant may experience pressure, temperature, etc. that cause formation of bubbles (e.g., consider steam formation in coolant that includes water). In such an example, one or more passages may act to separate such bubbles out of a spiral passage.

As an example, backbone passages may be radially offset from a spiral passage, for example, to lessen risk of fluid channeling. For example, a backbone passage may intersect with a spiral passage over a small portion of a wall of the spiral passage (see, e.g., the coolant core 207 of FIG. 2). In such a manner, flow in the spiral passage may be relatively uninterrupted in terms of its volumetric flow. As an example, a backbone passage may be in fluid communication with a plurality of windings of a spiral passage where pressure differences between connection points may result in some amount of flow in the backbone passage (e.g., from higher pressure windings to lower pressure windings). However, a backbone passage may include a cross-sectional flow area that is less than that of a spiral passage. In such an example, resistance to flow in the backbone passage (e.g., wall resistance) may be higher than that of a larger cross-sectional area spiral passage. For example, consider the dimensions of the members 265-1, 265-2 and 265-3 of FIG. 2 in comparison to the dimensions of the windings 275-1, 275-2, 275-3 and 275-4 (see also, e.g., FIG. 5). Further, cross-sectional area of inlets and outlets of passages can affect flow. As an example, an outlet of a spiral passage may be larger than a potential outlet of a backbone passage. As an example, a potential outlet of a backbone passage may have a cross-sectional flow area that may be less than that of a backbone passage. As an example, a potential outlet of a backbone passage may be disposed at an angle to a flow axis of a backbone passage (e.g., consider the impact on conservation of momentum). As an example, a spiral passage may include an outlet that is aligned with a flow axis of the spiral passage and a backbone passage may include an outlet that is not aligned with a flow axis of the backbone passage.

As an example, a turbocharger turbine housing can include a base that defines a turbine wheel opening that includes an axis that defines an axial direction; an exhaust inlet flange that defines an exhaust inlet; an exhaust outlet flange that defines an exhaust outlet; a wastegate shaft bore, a wastegate passage, a wastegate opening for the wastegate passage and a wastegate seat disposed about the wastegate opening; bosses where each of the bosses defines a coolant opening; a spiral coolant passage in fluid communication with at least two of the coolant openings where the spiral coolant passage includes at least two windings with respect to an axial dimension of the turbocharger turbine housing; and at least one coolant passage that is in fluid communication with at least two of the at least two windings of the spiral coolant passage.

Figure 6:
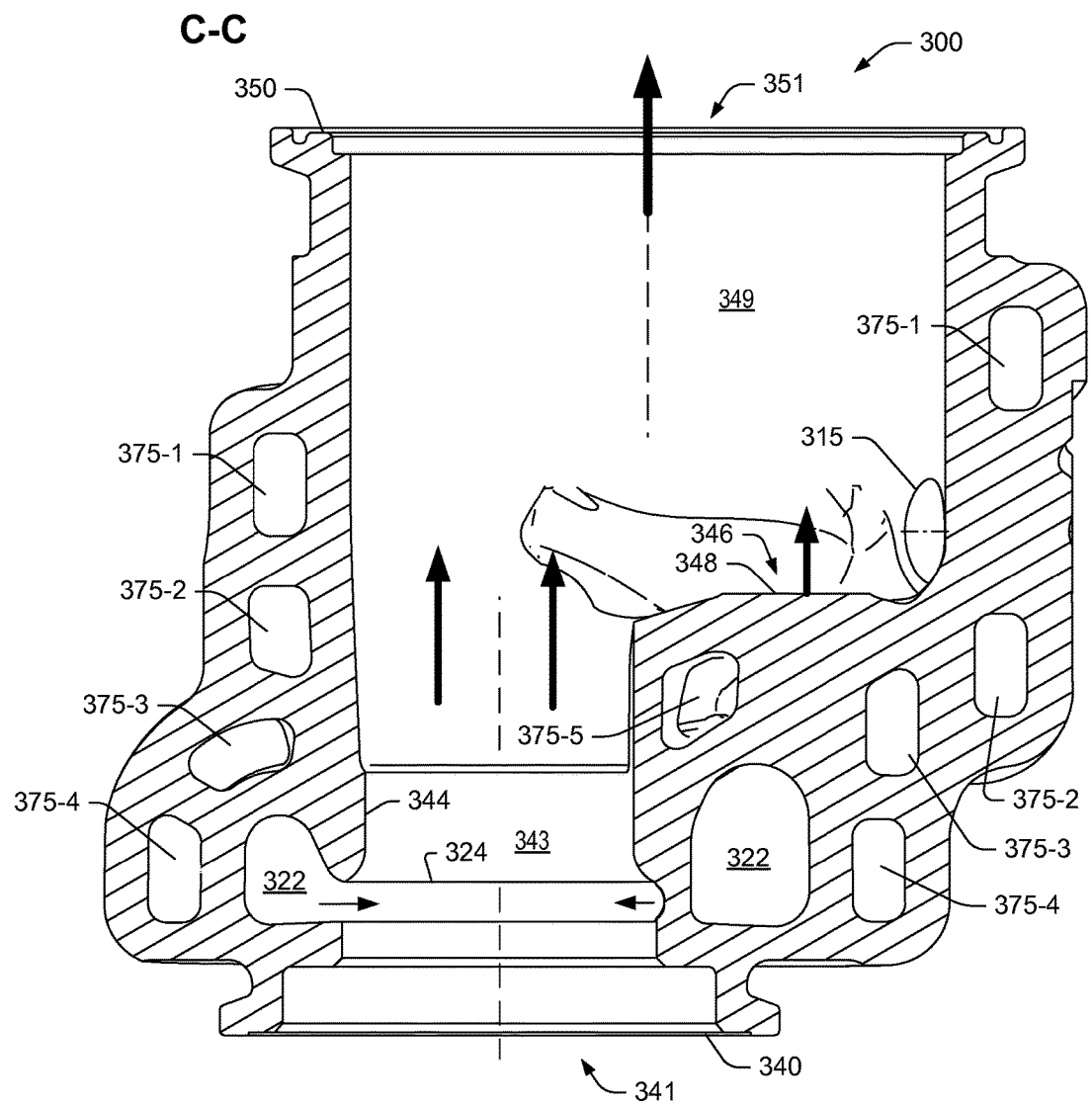
FIG. 6 is a cross-sectional view of the turbine housing of FIG. 3 along a line C-C.

FIG. 3 shows the plan view of the turbine housing 300 along with a line A-A and a line C-C. A cross-sectional view of the turbine housing 300 along the line A-A is shown in FIG. 4 and a cross-sectional view of the turbine housing 300 along the line C-C is shown in FIG. 6.

Figure 4:
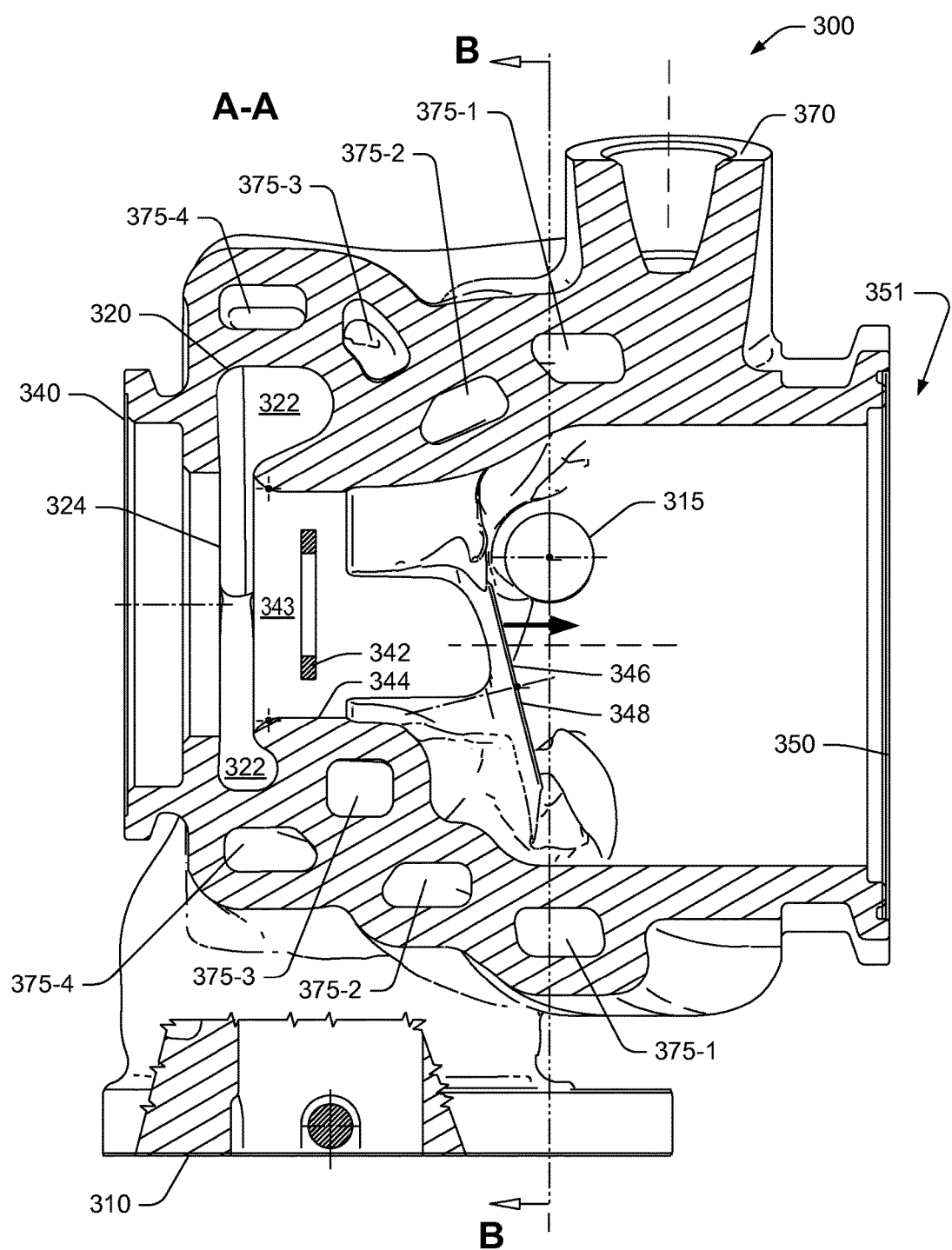
FIG. 4 is a cross-sectional view of the turbine housing of FIG. 3 along a line A-A.

In FIG. 4, the cross-sectional view of the turbine housing 300 shows various passages 375-1, 375-2, 375-3 and 375-4 that correspond to the spiral tubular portion 207 of the coolant passage core 204. FIG. 4 also shows a volute 322 defined in part by the volute wall 320 where the volute 322 includes a throat 324 that opens to a turbine wheel space 343 defined by the turbine housing 300. In such an example, exhaust may flow via the exhaust inlet 311 of the flange portion 310 to the volute 322 and then to the turbine wheel space 343 via the throat 324. The exhaust may drive a turbine wheel disposed in the turbine wheel space 343 and then exit the turbine housing 300 via the exhaust outlet 351 of the outlet flange portion 350. As to wastegating, where a shaft is received in the bore 315, a plug operatively coupled to the shaft may be positioned with respect to the wastegate opening 346, which includes the wastegate seat 348 thereabout. In the example of FIG. 4, an arrow is shown in a general direction of wastegated exhaust flow via the wastegate opening 346. As indicated in FIG. 3, the cross-section along the line A-A is offset to the right of the wastegate opening 346, which may receive exhaust via the exhaust inlet 311 of the flange portion 310 and wastegate such exhaust without circulating it in the volute 320 and passing it through the throat 324 to the turbine wheel space 343.

As shown in FIG. 4, with reference to FIG. 2, the coolant passages 375-1 and 375-2 are disposed proximate to the bore 315 and the coolant passages 375-3 and 375-4 are disposed proximate to the shroud wall 344 and the volute 322. Paths of the coolant passages 375-1, 375-2, 375-3 and 375-4 may be understood with reference to the windings 275-1, 275-2, 275-3 and 275-4 of the spiral tubular portion 207 of the coolant core 204 of the assembly 200 of FIG. 2.

Figure 5:
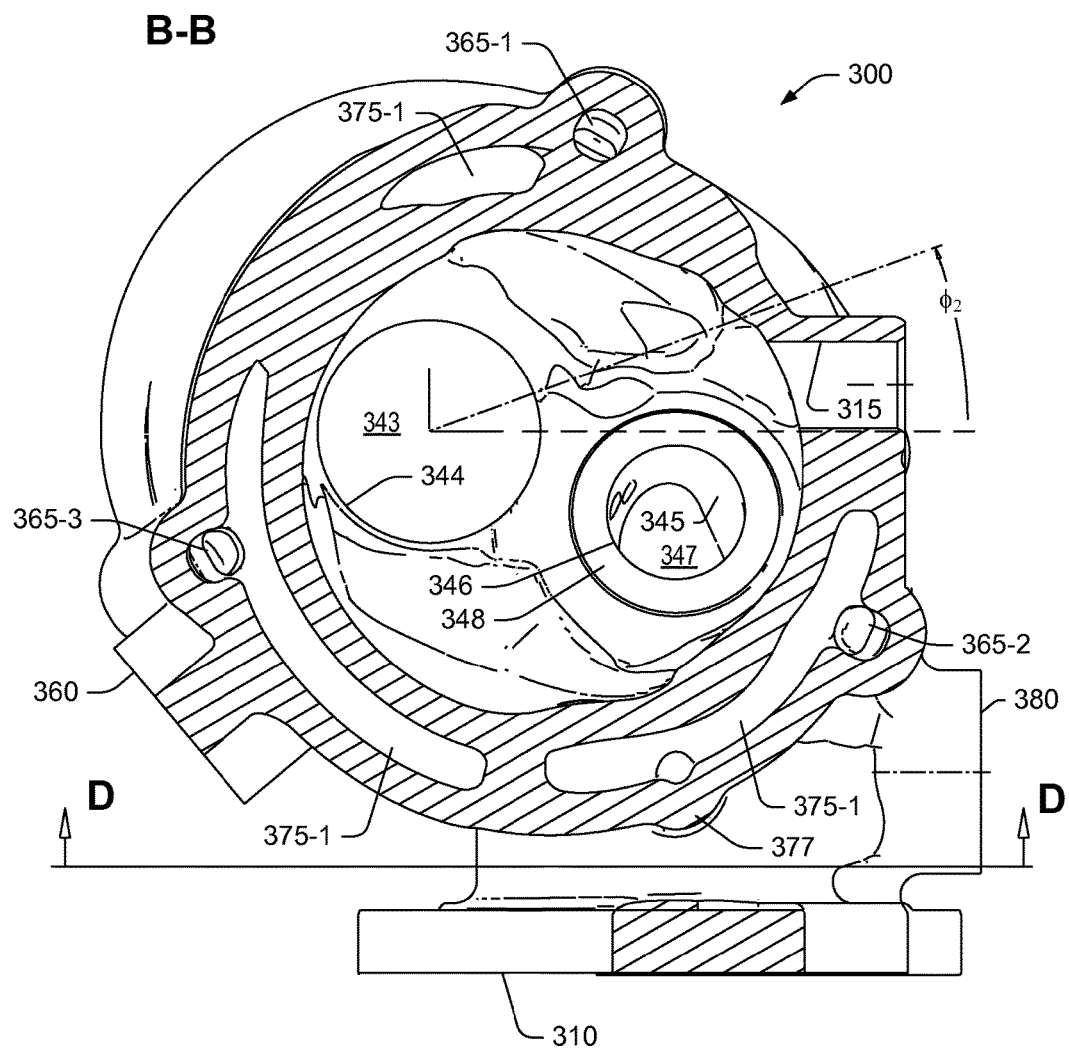
FIG. 5 is a cross-sectional view of the turbine housing of FIG. 4 along a line B-B.

FIG. 4 also shows a line B-B that passes through the coolant passage 375-1 and the bore 315. FIG. 5 shows a corresponding cross-sectional view of the turbine housing 300 along the line B-B.

In FIG. 5, coolant passages 365-1, 365-2 and 365-3 correspond to coolant passages that may be formed in part by the members 265-1, 265-2 and 265-3 of the coolant passage core 204 of the assembly 200 of FIG. 2. As shown, the coolant passages 365-1, 365-2 and 365-3 may fluidly couple the passage 375-1 with other passages (e.g., 375-2, 375-3 and 375-4) in a "short circuit" manner. In other words, fluid may flow axially along one of the coolant passage 365-1, 365-2 or 365-3, for example, from one passage "winding" to another passage "winding". Such an approach may provide for reduction of deadspace, drainage, multiple flow paths, etc.

FIG. 5 also shows the shroud wall 344 of the turbine wheel space 343 and a wastegate passage wall 345 that defines at least in part the wastegate passage 347, the wastegate opening 346 and the wastegate seat 348. As explained with respect to FIG. 3, a wastegate shaft may be received in the bore 315 where a plug is operatively coupled to the wastegate shaft and positionable with respect to the wastegate opening 346 where, for example, the plug may include a sealing surface that contacts the wastegate seat 348 for a closed orientation of the wastegate and that is positioned away from the wastegate seat 348 (e.g., non-contacting) for an open orientation of the wastegate.

Figure 7:
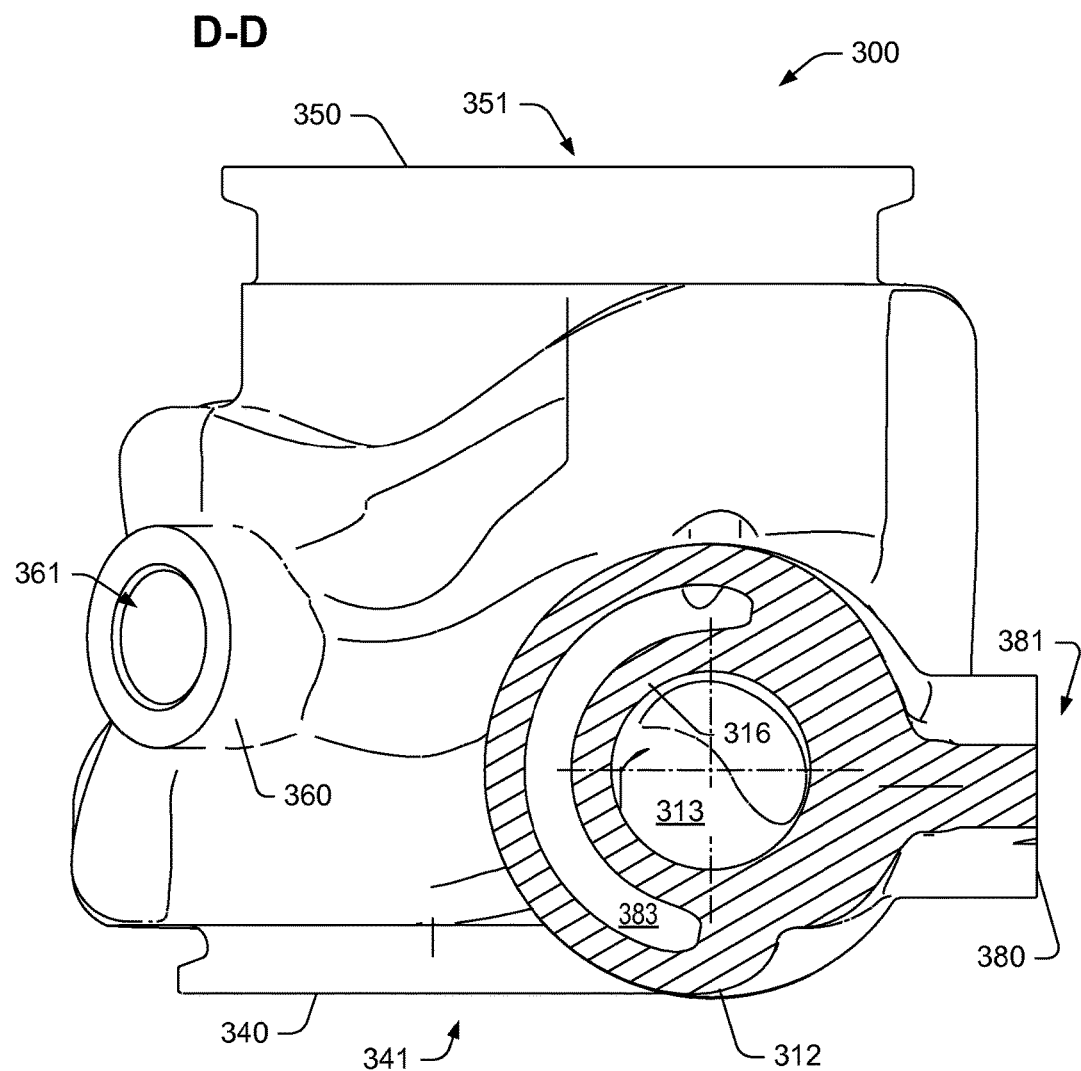
FIG. 7 is a cross-sectional view of the turbine housing of FIG. 5 along a line D-D.

FIG. 5 also shows a line D-D that is positioned between the flange portion 310 and a wall 377 that defines in part the passage 375-1. FIG. 7 shows a cross-sectional view of the turbine housing 300 along the line D-D.

As mentioned, FIG. 6 shows a cross-sectional view of the turbine housing 300 along the line C-C. Various arrows indicate some examples of possible directions of exhaust flow in the turbine housing 300. For example, exhaust may flow from the volute 322 via the throat 324 (e.g., or nozzle) to the turbine wheel space 343 and then exit the turbine housing 300 via the exhaust outlet 351 of the outlet flange portion 350. Where a wastegate is in an open orientation, exhaust may flow from the exhaust inlet 311 of the flange portion 310 to an exhaust outlet space 349 via the wastegate passage 347 and the wastegate opening 346 and to the exhaust outlet 351 of the outlet flange portion 350 of the turbine housing 300. As shown in the cross-sectional view of the turbine housing 300 along the line C-C, a coolant passage labeled 375-5 exists, which is in fluid communication with other passages (e.g., as divided to surround a bypass channel).

As mentioned, FIG. 7 shows a cross-sectional view of the turbine housing along the line D-D. In FIG. 7, the coolant opening 361 defined by the boss 360 is shown and the boss 380 is also shown, which defines the coolant opening 381. In the example of FIG. 7, the flange portion 310 extends to a neck 312 that includes an exhaust passage 313 and a coolant passage 383 where the exhaust passage 313 is in fluid communication with the inlet 311 of the flange portion 310 and where the coolant passage 383 is in fluid communication with the coolant opening 381 of the boss 380. As shown, the coolant passage 383 has a semi-annular cross-section about a wall 316 of the neck 312 that defines in part the exhaust passage 313. In operation, coolant in the coolant passage 383 may cool the wall 316, for example, as heat is transferred from exhaust in the exhaust passage 313 to the wall 316 and then to coolant in the coolant passage 383. Moving in a plane inwardly, a cross-sectional view may show the coolant opening 381 being in fluid communication with another semi-annular passage, for example, to the right of the exhaust passage 313. In such a manner, a wall or walls that define the exhaust passage 313 may be cooled by coolant.

Figure 8:
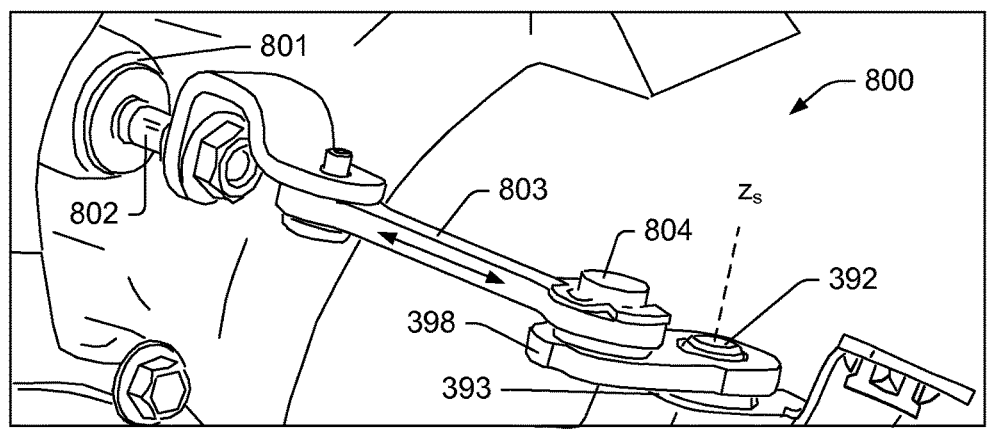
FIG. 8 shows a perspective view and a cross-sectional view of an example of an assembly that includes the turbine housing of FIG. 3.
Figure 8:
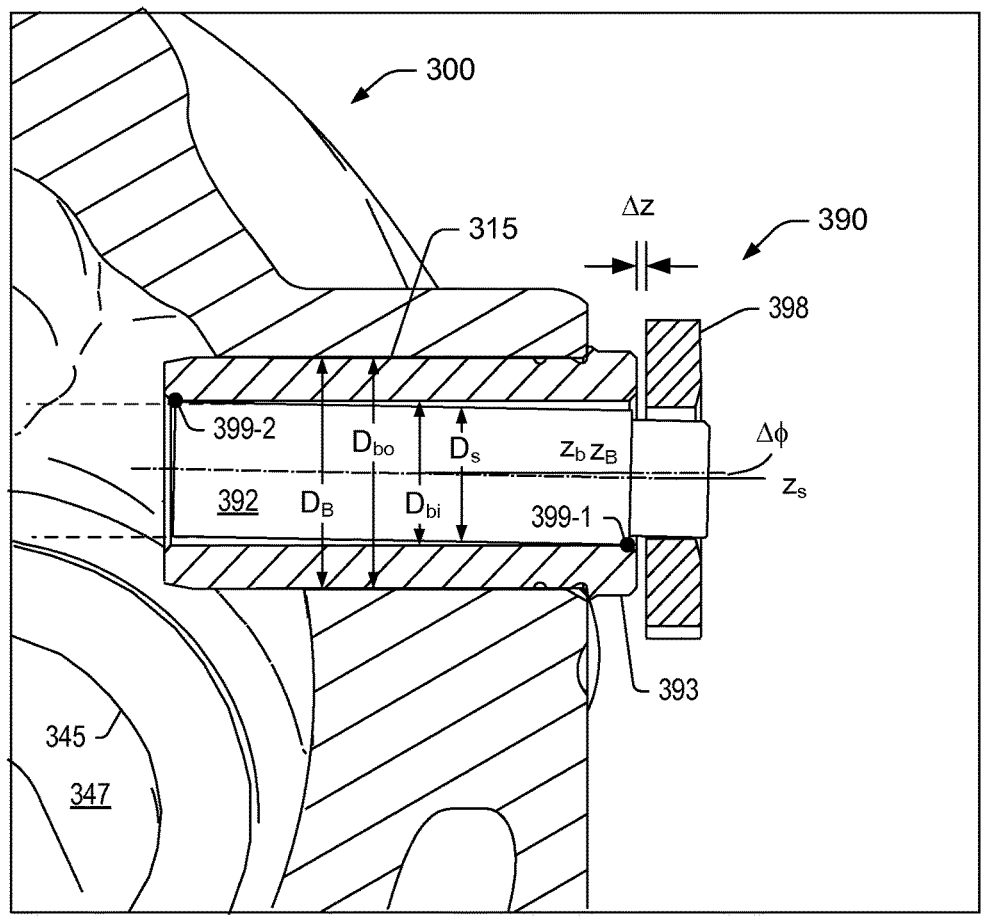

FIG. 8 shows an example of an assembly 800 that includes an actuator 801 with an actuator rod 802 that is operatively coupled to a link 803 that is operatively coupled to a peg 804 that is operatively coupled a control arm 398 fit to the wastegate shaft 392. As an example, an assembly may include various features of a turbocharger such as a GARRETT® GT 12 series turbocharger, a GARRETT® GT 14 series turbocharger, etc. For example, the turbine housing 300 may be a turbine housing of a turbocharger that includes features of the GARRETT® GT 1446 turbocharger (e.g., compressor section, center housing section, wastegate controller, etc.).

In the example of FIG. 8, the wastegate assembly 390 includes the bushing 393 configured for receipt by the bore 315 of the turbine housing 300, a control arm 398 coupled to the peg 804 and a wastegate arm and plug (see, e.g., FIG. 3) that includes the shaft 392. As shown, the bushing 393 is disposed between the bore 315 and the shaft 392, for example, to support rotation of the shaft 392, to act to seal an exhaust chamber from an exterior space (e.g., to reduce exhaust leakage), etc. The bore 315, the bushing 393 and the shaft 392 may each be defined by a diameter or diameters as well as one or more lengths. For example, the shaft 392 includes a diameter $D_s$, the bore 315 includes a diameter $D_B$ while the bushing 393 includes an inner diameter $D_{bi}$ and an outer diameter $D_{bo}$. In the example of FIG. 8, when the various components are assembled, as to such diameters: $D_B > D_{bo} > D_{bi} > D_s$. As to lengths, a length of the shaft 392 exceeds a length of the bushing 393, which exceeds a length of the bore 315. Such lengths may be defined with respect to a shaft axis $z_s$, a bushing axis $z_b$ and a bore axis $z_B$. As shown, the bushing 393 is disposed axially between a shoulder of the shaft 392 (e.g., a face of the arm 398 where the arm 398 and the shaft 392 meet) and the control arm 398.

In the example of FIG. 8, a gap $\Delta z$ is shown between a surface of the bushing 398 and a surface of the control arm 398, which allows for axial movement of the shaft 392, for example, to facilitate self-centering of the plug 396 with respect to the wastegate seat 348 (see, e.g., FIG. 3). For example, the plug 396 may include shape that acts to self-center with respect to a shape of the wastegate seat 348. As an example, the plug 396 may include a toroidal portion and the wastegate seat 348 may include a conical surface such that the plug 396 may self-center with respect to the wastegate seat 348. Self-centering may be facilitated by application of force that acts to maintain the plug 396 in a closed position with respect to the wastegate seat 348.

As mentioned, the turbine housing 300 can include coolant passages that can be used to remove heat from the turbine housing 300 where at least one of the coolant passages passes proximate to the bore 315 for the wastegate shaft 392 (see, e.g., the passages 375-1 and 375-2 with respect to the bore 315 in FIG. 6). In such an example, temperature may be controlled in a manner that facilitates operation of the wastegate shaft 392 via the actuator 801, that facilitates seating of the wastegate plug 396 with respect to the wastegate seat 348, that facilitates sealing of the bore 315 at least in part by the bushing 393, etc. For example, temperature may be controlled to maintain clearances, contact surfaces, etc. (e.g., with respect to material properties such as thermal expansion coefficients, etc.). As an example, temperature control may help to maintain a tilt clearance as indicated by the angle $\Delta \phi$ and the contact points 399-1 and 399-2 in FIG. 8 and, for example, temperature control may help to maintain the clearance $\Delta z$ (e.g., to facilitate self-centering of a plug with respect to a wastegate seat). As an example, the turbine housing 300 may facilitate wastegate controllability and may reduce leakage of exhaust via the bore 315, which, in turn, may improve emissions.

Figure 9:
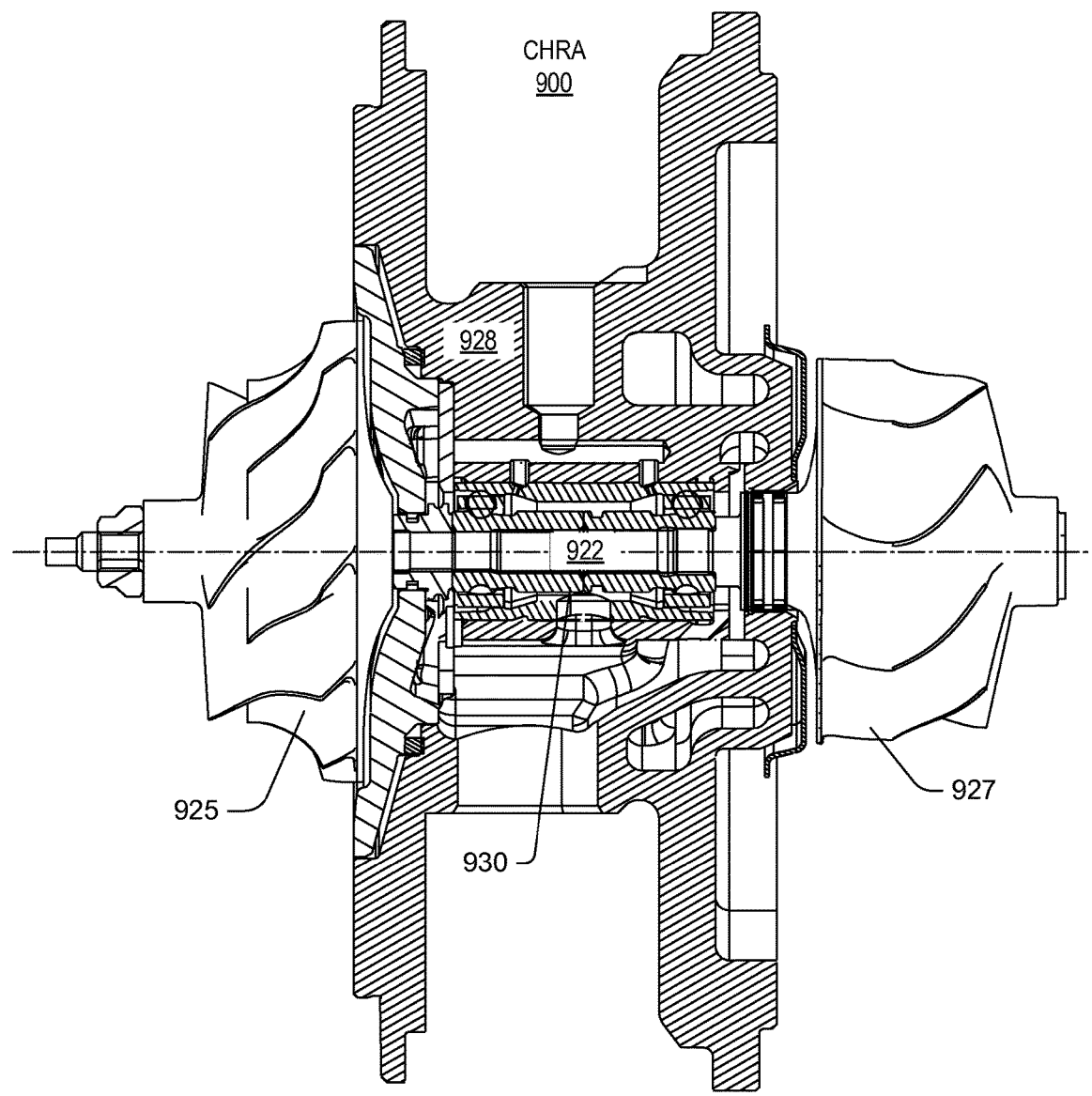
FIG. 9 shows a cross-sectional view of an example of a center housing rotating assembly (CHRA).

FIG. 9 shows an example of a center housing rotating assembly (CHRA) 900 that includes a shaft 922, a compressor wheel 925, a turbine wheel 927, a center housing 928 and a bearing assembly 930 supported in a through bore of the center housing 928. As an example, a turbine housing such as the turbine housing 300 may be operatively coupled to the center housing 928 (e.g., as part of a turbocharger). As an example, a center housing may include lubricant passages for flow of lubricant at least to the bearing assembly 930, which rotatably supports the shaft 922, which may be joined to the turbine wheel 927 via welding (e.g., as a shaft and wheel assembly) and joined to the compressor wheel 925 via a bore of the compressor wheel 925 and a nut. As an example, a compressor wheel may be a boreless compressor wheel.

As an example, an assembly may be fitted to an exhaust conduit or other component of an internal combustion engine (see, e.g., examples of FIG. 1), for example, via a flange such that exhaust is received via an inlet and directed to a volute of a turbine housing. From the volute, exhaust may be directed via a nozzle to a turbine wheel disposed in the turbine housing to flow and expand in a turbine wheel space. Exhaust can then exit the turbine wheel space by flowing to a chamber and then out of the turbine housing via an exhaust outlet opening. As to wastegating, upon actuation of a control linkage by an actuator, a wastegate arm and plug may be rotated such that at least a portion of the received exhaust can flow in a wastegate passage, past a wastegate seat and into the chamber, rather than through the nozzle to the turbine wheel space. The wastegated portion of the exhaust may then exit the turbine housing via the exhaust outlet opening (e.g., and pass to an exhaust system of a vehicle, be recirculated in part, etc.).

As an example, a turbocharger assembly may include features of the assembly 800 of FIG. 8, features of the turbine housing 300 of FIG. 3 (e.g., including wastegate features and coolant passages) and features of the CHRA of FIG. 9. As an example, such a turbocharger assembly may be fit with one or more conduits that can provide fluid to the coolant passages of the turbine housing 300 and one or more conduits that can receive fluid from the coolant passages of the turbine housing 300. Such fluid may be fluid of an engine cooling system of an internal combustion engine.

While various examples refer to coolant and coolant passages, depending on operational conditions, a fluid may be at a temperature that is higher than that of a turbine housing. For example, consider an environment where temperatures may fall below the freezing point of water and where a block heater may be employed that may heat coolant to a temperature that is above an ambient temperature. In such an example, circulation of such coolant to coolant passages of a turbine housing may act to increase the temperature of the turbine housing.

As an example, coolant may be pressurized by a fluid pump to flow in coolant passages. Depending on desired heat transfer, temperature regimes, etc., coolant may be provided to one or more coolant openings to flow in a particular direction (e.g., from an inlet or inlets to an outlet or outlets). As an example, a system may include a pump, pumps, a valve, valves, etc. to control flow, control direction of flow, etc. As an example, a controller may control flow of coolant to a turbine housing based at least in part on a measured temperature and/or other operational condition.

As an example, a turbocharger turbine housing can include a base that defines a turbine wheel opening that includes an axis that defines an axial direction; a exhaust inlet flange that defines an exhaust inlet; an exhaust outlet flange that defines an exhaust outlet; a wastegate shaft bore, a wastegate passage, a wastegate opening for the wastegate passage and a wastegate seat disposed about the wastegate opening; bosses where each of the bosses defines a coolant opening; a spiral coolant passage in fluid communication with at least two of the coolant openings where the spiral coolant passage includes at least two windings with respect to an axial dimension of the turbocharger turbine housing; and at least one coolant passage that is in fluid communication with at least two of the at least two windings of the spiral coolant passage. In such an example, the at least one coolant passage that is in fluid communication with at least two of the at least two windings of the spiral coolant passage can include a coolant passage that is radially offset from the axis and that extends a length in the axial direction.

As an example, a turbocharger turbine housing can include a coolant passage that is in fluid communication with at least three windings of a spiral coolant passage. As an example, a turbocharger turbine housing can include a spiral coolant passage with at least three windings. As an example, a spiral coolant passage may include four windings.

As an example, a turbocharger turbine housing can include a wastegate shaft bore that is at least partially disposed between two windings of a spiral coolant passage. In such an example, one of the two windings may be a closest winding to the exhaust outlet.

As an example, a turbocharger turbine housing can include three bosses where each of the bosses defines a respective coolant opening. In such an example, one of the three coolant openings may be sealed (e.g., a sealed opening) and the other two of the coolant openings may be a coolant inlet and a coolant outlet.

As an example, a coolant passage core for forming coolant passages in a turbocharger turbine housing can include a spiral tubular portion that extends from a first end to a second end and that includes at least two windings therebetween; and at least one member that joins at least two of the at least two windings of the spiral tubular portion. In such an example, the core may include sand (e.g., compacted sand). As an example, a core may include a spiral tubular portion that includes at least three windings. As an example, a core may include a gap that exists between an end winding and an adjacent winding where the gap allows for formation of a wastegate shaft bore therebetween (e.g., via a portion of another core). As an example, a core can include at least two members that join at least two of at least two windings of a spiral tubular portion of the core.

As an example, a coolant passage core can include a branch that extends from a spiral tubular portion where the branch includes an end. As an example, coolant passage core can include a first end, a second end and an end of the branch that are coolant opening features for formation of at least one coolant inlet and at least one coolant outlet.

As an example, a method of cooling a turbocharger turbine housing can include flowing coolant to a spiral coolant passage that includes at least two windings; and flowing at least a portion of the coolant in an axial direction from one of the at least two windings to another one of the at least two windings via a coolant passage that is in fluid communication with at least two of the at least two windings of the spiral coolant passage. Such a method may include, for example, flowing air in an axial direction in the coolant passage.

As an example, a method may include sealing one of three openings of a spiral coolant passage and using the two unsealed openings as a coolant inlet and a coolant outlet. As an example, a method can include flowing coolant to a spiral coolant passage and flowing at least a portion of the coolant in two of at least two windings of the spiral coolant passage where a wastegate shaft bore is at least partially disposed between the two windings.

As an example, a method for forming a turbocharger turbine housing can include providing a coolant passage core that includes a spiral tubular portion that extends from a first end to a second end and that includes at least two windings therebetween and at least one member that joins at least two of the at least two windings of the spiral tubular portion; providing a central core disposed at least in part within a central space defined at least in part by the spiral tubular portion; pouring molten material into a mold that includes the coolant passage core and the central core; and removing the coolant passage core and the central core to form the turbocharger turbine housing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine housing comprising:
a base that defines a turbine wheel opening that comprises an axis that defines an axial direction;
an exhaust inlet flange that defines an exhaust inlet;
an exhaust outlet flange that defines an exhaust outlet;
a wastegate shaft bore, a wastegate passage, a wastegate opening for the wastegate passage and a wastegate seat disposed about the wastegate opening;
bosses wherein each of the bosses defines a coolant opening;
a spiral coolant passage in fluid communication with at least two of the coolant openings wherein the spiral coolant passage comprises at least two 360 degree windings with respect to an axial dimension of the turbocharger turbine housing; and
at least one coolant passage that intersects at least two of the at least two 360 degree windings of the spiral coolant passage to be in fluid communication with the at least two of the at least two 360 degree windings of the spiral coolant passage.

2. The turbocharger turbine housing of claim 1 wherein the at least one coolant passage that is in fluid communication with at least two of the at least two 360 degree windings of the spiral coolant passage comprises a coolant passage that is radially offset from the axis and that extends a length in the axial direction.

3. The turbocharger turbine housing of claim 1 wherein the at least one coolant passage that is in fluid communication with at least two of the at least two 360 degree windings of the spiral coolant passage comprises a coolant passage that is in fluid communication with at least three 360 degree windings of the spiral coolant passage.

4. The turbocharger turbine housing of claim 1 wherein the spiral coolant passage comprises at least three 360 degree windings.

5. The turbocharger turbine housing of claim 1 wherein the spiral coolant passage comprises four 360 degree windings.

6. The turbocharger turbine housing of claim 1 wherein the wastegate shaft bore is at least partially disposed between two of the 360 degree windings of the spiral coolant passage.

7. The turbocharger turbine housing of claim 6 wherein one of the two 360 degree windings is a closest winding to the exhaust outlet.

8. The turbocharger turbine housing of claim 1 wherein the bosses comprise three bosses wherein each of the three bosses defines a respective coolant opening.

9. The turbocharger turbine housing of claim 8 wherein one of the three coolant openings of the three bosses is sealed and the other two of the coolant openings of the three bosses comprise a coolant inlet and a coolant outlet.

10. The turbocharger turbine housing of claim 1 wherein the at least one coolant passage comprises at least one axial coolant passage that intersects at least two of the at least two 360 degree windings of the spiral coolant passage.

11. A method of cooling a turbocharger turbine housing, the method comprising:
in the turbocharger turbine housing, that comprises a base that defines a turbine wheel opening that comprises an axis that defines an axial direction; an exhaust inlet flange that defines an exhaust inlet; an exhaust outlet flange that defines an exhaust outlet; a wastegate shaft bore, a wastegate passage, a wastegate opening for the wastegate passage and a wastegate seat disposed about the wastegate opening; bosses wherein each of the bosses defines a coolant opening; a spiral coolant passage in fluid communication with at least two of the coolant openings wherein the spiral coolant passage comprises at least two 360 degree windings with respect to an axial dimension of the turbocharger turbine housing; and at least one coolant passage that intersects at least two of the at least two 360 degree windings of the spiral coolant passage to be in fluid communication with the at least two of the at least two 360 degree windings of the spiral coolant passage, flowing coolant to the spiral coolant passage; and
flowing at least a portion of the coolant in an axial direction from one of the at least two 360 degree windings to another one of the at least two 360 degree windings via at least one of the at least one coolant passage that is in fluid communication with at least two of the at least two 360 degree windings of the spiral coolant passage.

12. The method of claim 11 further comprising flowing air in an axial direction in at least one of the at least one coolant passage.

13. The method of claim 11 further comprising sealing one of three openings of the spiral coolant passage and using the two unsealed openings as the coolant openings that comprise a coolant inlet and a coolant outlet.

14. The method of claim 11 wherein flowing coolant to the spiral coolant passage comprises flowing coolant in two of the at least two 360 degree windings wherein the wastegate shaft bore is at least partially disposed between the two 360 degree windings.

15. A turbocharger turbine housing comprising:
a base that defines a turbine wheel opening that comprises an axis that defines an axial direction;
an exhaust inlet flange that defines an exhaust inlet;
an exhaust outlet flange that defines an exhaust outlet;
a wastegate shaft bore, a wastegate passage, a wastegate opening for the wastegate passage and a wastegate seat disposed about the wastegate opening;
bosses wherein each of the bosses defines a coolant opening;
a spiral coolant passage in fluid communication with at least two of the coolant openings wherein the spiral coolant passage comprises at least two windings with respect to an axial dimension of the turbocharger turbine housing; and
at least one coolant passage that is in fluid communication with at least two of the at least two windings of the spiral coolant passage, wherein the spiral coolant passage comprises four windings.

\* \* \* \* \*